（12) United States Patent
Hota et al.

(10) Patent No.: US 12,238,426 B2
(45) Date of Patent: Feb. 25, 2025

(54) METHODS AND ELECTRONIC DEVICE FOR HANDLING FIXED BOUND CALIBRATION DATA

(71) Applicant: SAMSUNG ELECTRONICS CO., LTD., Suwon-si (KR)

(72) Inventors: Manjit Hota, Karnataka (IN); Puneet Pandey, Karnataka (IN); Ayush Goel, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 17/861,304

(22) Filed: Jul. 11, 2022

(65) Prior Publication Data
US 2023/0232118 A1   Jul. 20, 2023

(30) Foreign Application Priority Data

Jan. 17, 2022   (IN) .............................. 202241002629

(51) Int. Cl.
H04N 23/80    (2023.01)
G06T 5/00     (2024.01)
H04N 17/00    (2006.01)

(52) U.S. Cl.
CPC .............. *H04N 23/80* (2023.01); *G06T 5/00* (2013.01); *H04N 17/002* (2013.01)

(58) Field of Classification Search
CPC ...... H04N 23/80; H04N 17/002; H04N 19/86; H04N 5/907; H04N 19/136; G06T 5/00; G06F 3/0679; G06F 2206/1014
See application file for complete search history.

(56) References Cited

U.S. PATENT DOCUMENTS

| | | | |
|---|---|---|---|
| 5,867,602 A | 2/1999 | Zandi et al. | |
| 5,883,830 A * | 3/1999 | Hirt | H04N 25/67 365/115 |
| 6,091,777 A | 7/2000 | Guetz et al. | |
| 6,396,539 B1 * | 5/2002 | Heller | H04N 25/63 348/E5.081 |
| 6,819,358 B1 * | 11/2004 | Kagle | H04N 25/68 348/E5.081 |
| 6,917,380 B1 * | 7/2005 | Tay | H04N 25/68 348/E5.081 |
| 8,973,085 B2 | 3/2015 | Tsao | |

(Continued)

FOREIGN PATENT DOCUMENTS

| | | |
|---|---|---|
| JP | 5410158 | 2/2014 |
| JP | 2017-055243 | 3/2017 |

OTHER PUBLICATIONS

Matthew J. Zukoski et al., "A novel approach to medical image compression", Int. J. Bioinformatics Research and Applications, vol. 2, No. 1, 2006, pp. 89-103.

(Continued)

*Primary Examiner* — Hung H Lam
(74) *Attorney, Agent, or Firm* — F. CHAU & ASSOCIATES, LLC

(57) ABSTRACT

A method for handling a fixed bound calibration data in an electronic device includes: determining, by the electronic device, a calibration data from a calibration setup; and generating and encoding, by the electronic device, a fixed bound calibration data based on the determined calibration data.

20 Claims, 10 Drawing Sheets

(56) References Cited

U.S. PATENT DOCUMENTS

| | | | |
|---|---|---|---|
| 9,026,800 B2 | 5/2015 | Rodgers et al. | |
| 9,191,594 B2 | 11/2015 | Pyeoun et al. | |
| 9,338,446 B2 | 5/2016 | Gao et al. | |
| 10,834,347 B2 | 11/2020 | Jung et al. | |
| 11,006,127 B2 | 5/2021 | Varia et al. | |
| 2013/0038751 A1* | 2/2013 | Kurahashi | H04N 13/128 348/222.1 |
| 2020/0195977 A1 | 6/2020 | Gadelrab et al. | |
| 2020/0212091 A1* | 7/2020 | Sadhu | H01L 31/02327 |

OTHER PUBLICATIONS

Ye Wang et al., "Efficient Helper Data Reduction in SRAM PUFs via Lossy Compression", IEEE 2018, pp. 1453-1458.

Rawsam Abdaladheem Hasan, "Combination of Lossy and Lossless for Image Compression", European Scientific Journal Nov. 2014 edition vol. 10, No. 33 ISSN: 1857-7881, (Print) e-ISSN 1857-7431, pp. 230-242.

* cited by examiner

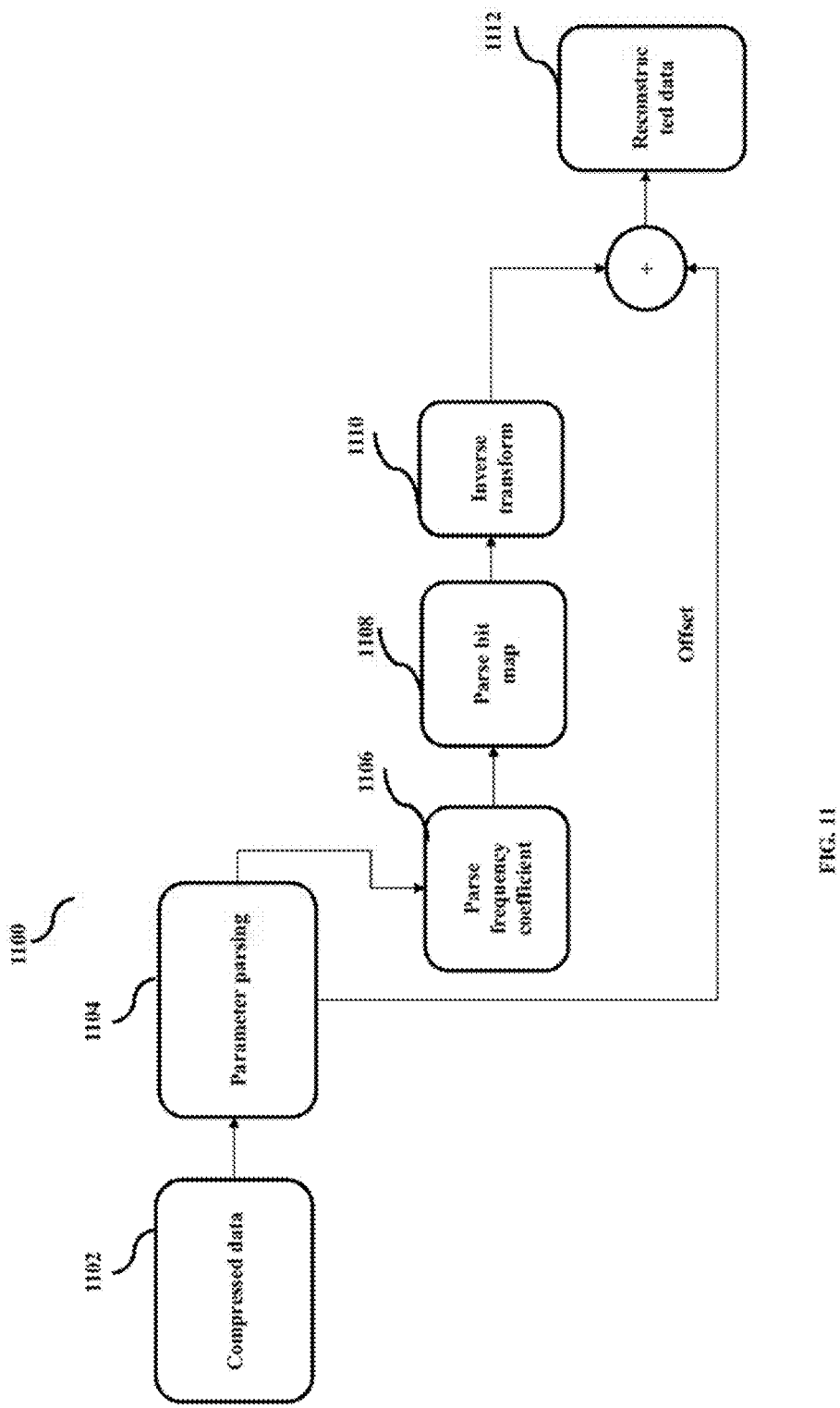

METHODS AND ELECTRONIC DEVICE FOR HANDLING FIXED BOUND CALIBRATION DATA

CROSS-REFERENCE TO RELATED APPLICATION

This U.S. nonprovisional application claims priority under 35 U.S.C. § 119 to Indian Patent Application No. 202241002629 filed on Jan. 17, 2022, the disclosure of which is incorporated by reference herein in its entirety.

TECHNICAL FIELD

The present inventive concept relates to the field of a calibration data handling system, and more particularly, to methods and an electronic device for handling a fixed bound calibration data in an electronic device.

DISCUSSION OF THE RELATED ART

In an electronic device, one time programmable (OTP) memory stores a variety of information and data such as static bad pixel data, lens shading data and cross talk data. With an increase in a sensor resolution in the electronic device, a size of the mentioned data may increase. For example, cross talk data for 48 MP sensors may use 4 k space, while data for 108 MP sensors may use 9 k space. Further, the OTP memory comes in power of 2 (1 k, 2 k, 4 k, 8 k, 16 k, etc.). The price of OTP memory may increase with an increase in the size of the OTP memory.

FIG. 1 is an example illustration (100) in which the process of generating an output image using a calibration data is depicted, according to a comparative example. Referring to the FIG. 1, generally, the electronic device, in a calibration setup, may determine the calibration data from the calibration setup and store the calibration data in the OTP memory. Further, the electronic device, in real-time, may obtain the calibration data and the raw image. Additionally, the electronic device may process the raw image using the calibration data and at least one compensation technique to generate an output image.

SUMMARY

According to an exemplary embodiment of the present inventive concept, a method for handling a fixed bound calibration data in an electronic device includes: determining, by the electronic device, a calibration data from a calibration setup; and generating and encoding, by the electronic device, a fixed bound calibration data based on the determined calibration data.

According to an exemplary embodiment of the present inventive concept, a method for handling a fixed bound calibration data in an electronic device includes: obtaining, by the electronic device, an encoded fixed bound calibration data; obtaining, by the electronic device, a raw image; and processing, by the electronic device, the raw image using the obtained encoded fixed bound calibration data and at least one compensation technique to generate an output image.

According to an exemplary embodiment of the present inventive concept, an electronic device configured to handle a fixed bound calibration data includes: a processor, a one time programmable (OTP) memory including information, and a fixed bound calibration data controller coupled with the processor and the OTP memory and configured to: determine a calibration data from a calibration setup; and generate and encode a fixed bound calibration data based on the determined calibration data.

According to an exemplary embodiment of the present inventive concept, an electronic device for handling a fixed bound calibration data includes: a processor, a one time programmable (OTP) memory including information, and a fixed bound calibration data controller coupled with the processor and the OTP memory, and configured to: obtain encoded fixed bound calibration data; obtain a raw image; and process the raw image using the obtained encoded fixed bound calibration data and at least one compensation technique to generate an output image.

BRIEF DESCRIPTION OF THE DRAWINGS

The above and other features of the present inventive concept will become more apparent by describing in detail exemplary embodiments thereof, with reference to the accompanying drawings, in which:

FIG. 11 illustrates operations of an OTP data decoder, according to an exemplary embodiment of the present inventive concept.

DETAILED DESCRIPTION OF THE EMBODIMENTS

Figure 1:
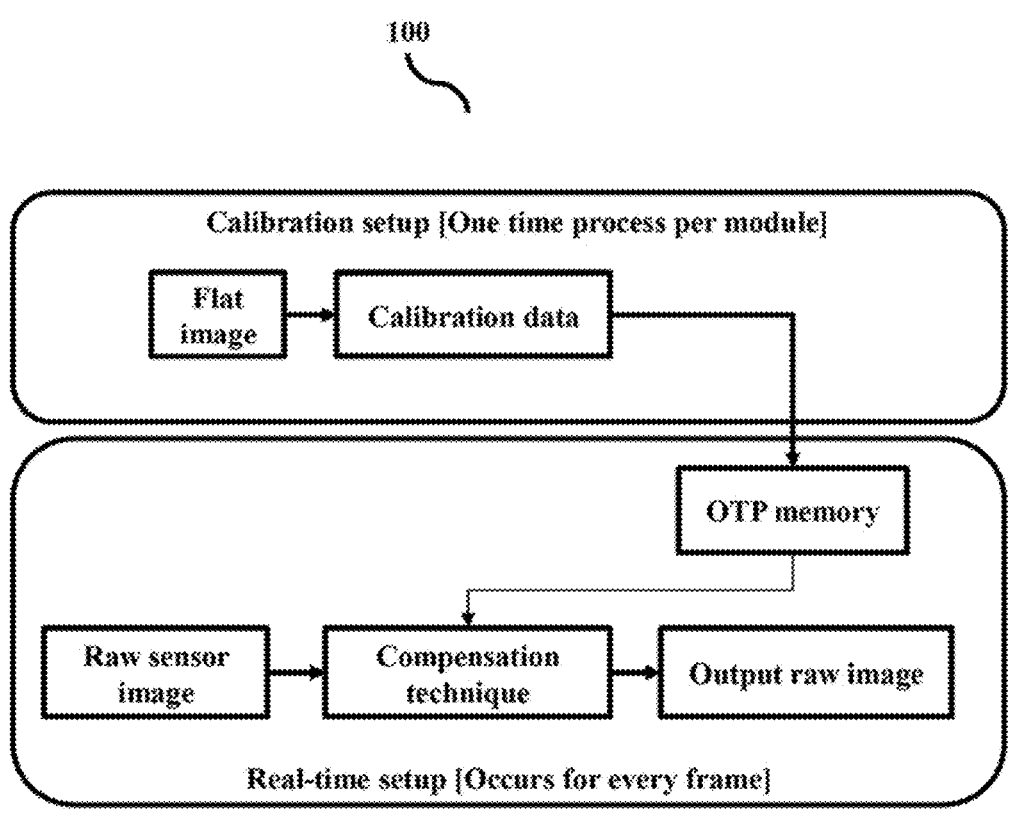
FIG. 1 illustrates the process of generating an output image using calibration data, according to a comparative example.

Exemplary embodiments of the present invention will be described more fully hereinafter with reference to the accompanying drawings. Descriptions of well-known components and processing techniques may be omitted to not unnecessarily obscure the exemplary embodiments of the present inventive concept herein.

Exemplary embodiments of the present inventive concept herein provide methods for handling a fixed bound calibration data in an electronic device. The method includes determining, by the electronic device, a calibration data from a calibration setup. Further, the method includes generating and encoding, by the electronic device, a fixed bound calibration data based on the determined calibration data.

Unlike conventional methods and systems, the method according to an exemplary embodiment of the present inventive concept can be used to compress a calibration data to a fixed size while keeping a quality of output associated with the calibration data which uses the data preserved. The calibration data can be increased based on the physical parameters like pixel size, number of pixels, etc.

In the drawings, like reference numerals may refer to like elements, and thus repetitive descriptions may be omitted.

Figure 2:
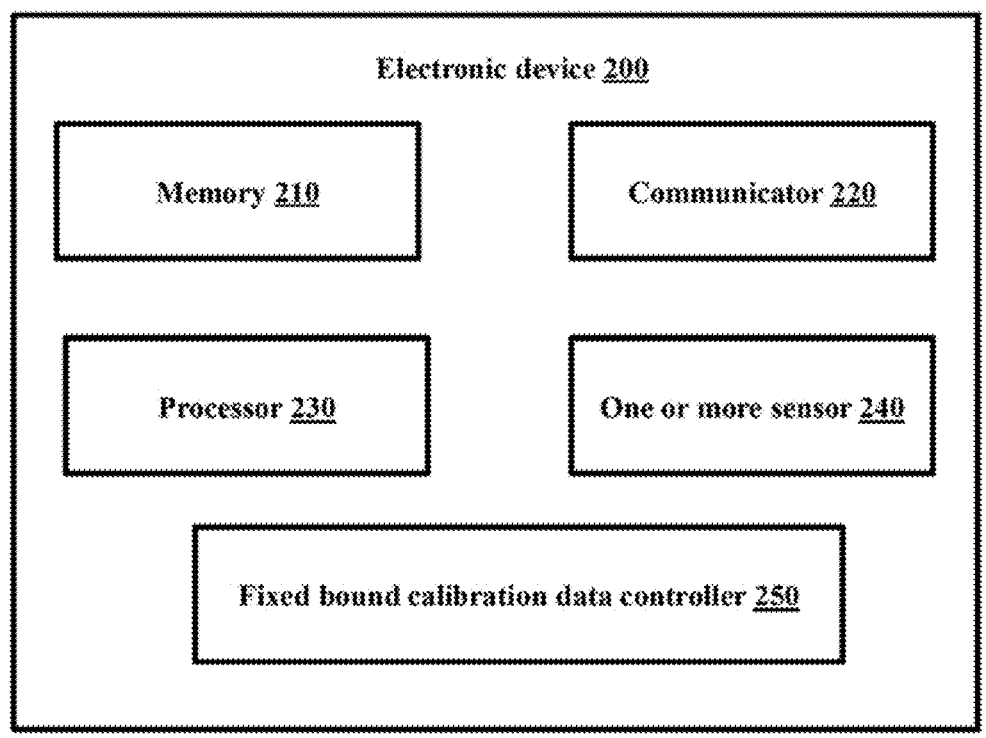
FIG. 2 illustrates an electronic device for handling a fixed bound calibration data, according to an exemplary embodiment of the present inventive concept.

FIG. 2 illustrates an electronic device (200) for handling a fixed bound calibration data, according to an exemplary embodiment of the present inventive concept. The electronic device (200) can be, for example, a laptop, a desktop computer, a notebook, a vehicle to everything (V2X) device, a smartphone, a tablet, an internet of things (IoT) device, an immersive device, a virtual reality device, a foldable device or the like. However, the present inventive concept is not limited thereto.

In an exemplary embodiment of the present inventive concept, the electronic device (200) includes a one time programmable (OTP) memory (210), a communicator (220), a processor (230), one or more sensor (240) and a fixed bound calibration data controller (250). The processor (230) is coupled with the communicator (220), the OTP memory (210), the one or more sensor (240) and the fixed bound calibration data controller (250).

The fixed bound calibration data controller (250) is configured to determine a calibration data from a calibration setup. Based on the determined calibration data, the fixed bound calibration data controller (250) is configured to generate and encode a fixed bound calibration data using the fixed bound OTP encoder (250a) (as shown in the FIG. 5). The fixed bound calibration data corresponds to data of the sensor (240) associated with the electronic device (200). The data can be, for example, pixel cross talk data, bad pixel data and lens shading data; however, the present inventive concept is not limited thereto.

In an exemplary embodiment of the present inventive concept, the fixed bound calibration data controller (250) is configured to estimate a grid level complexity for the calibration data. The grid level complexity is estimated by measuring an entropy of the grid and measuring a variance of the grid. For example, the grid corresponds to the grid level complexity.

For example, for each block, the entropy can be calculated as $$\sum_{i=1}^{C} -p_i \log_2 p_i.$$

Here $P_i$ is the probability of data being $i^{th}$ histogram bucket. The table 1 represents the bit allocation based on the entropy.

TABLE 1

| Entropy | Bit Allocated |
|---|---|
| 0-0.5 | 35 |
| 0.5-1 | 37 |
| 1-1.5 | 40 |
| 1.5-1.70 | 45 |
| 1.70-2.5 | 47 |
| >2.5 | 60 |

For example, for each block, the variance can be calculated as variance=Σ(data*data−(average(data)*average(data)))/(total number of data points). The table 2 represents the bit allocation based on the variance

TABLE 2

| Variance | Bit Allocated |
|---|---|
| 0-10 | 10 |
| 10-40 | 25 |
| 740-100 | 35 |
| >100 | 60 |

Further, the fixed bound calibration data controller (250) is configured to allocate a grid level bit budget based on the estimated grid level complexity. Further, the fixed bound calibration data controller (250) is configured to transform a grid level data to a frequency domain. In addition, the fixed bound calibration data controller (250) is configured to select a frequency component associated with the calibration data. The grid level data may be transformed to the frequency domain using a signal processing method (e.g., a Discrete Cosine Transform (DCT) or the like). In an exemplary embodiment of the present inventive concept, the frequency component may be selected by determining a low frequency data based on the allocated grid level bit budget (as shown in the FIG. 7). In an embodiment of the present inventive concept, the frequency component may be selected by determining a random coefficient position based on the magnitude of the transformed calibration data (as shown in the FIG. 9).

In an exemplary embodiment of the present inventive concept, the frequency component associated with the calibration data may be selected by determining an offset of the calibration data. Further, the frequency component associated with the calibration data may be selected by transforming the calibration data to a frequency domain to generate an energy compaction by using the data with a difference between the offset and the calibration data, and by selecting the frequency component associated with the calibration data based on the generated energy compaction. The offset is subtracted from all data elements to control a magnitude of a signal.

Further, the fixed bound calibration data controller (250) is configured to apply a lossless compression on the selected frequency component. Further, the fixed bound calibration data controller (250) is configured to generate the fixed bound calibration data based on the selected frequency component and the grid level size bit budget.

Further, the fixed bound calibration data controller (250) is configured to store the encoded fixed bound calibration data in the OTP memory (210). Further, the fixed bound calibration data controller (250) is configured to decode the encoded fixed bound calibration data stored in the OTP memory (210) using the OTP data decoder (250b) (as shown in the FIG. 5).

Further, the fixed bound calibration data controller (250) is configured to obtain a raw image. Further, the fixed bound calibration data controller (250) is configured to process the raw image using the decoded fixed bound calibration data to compensate calibrated artefacts for image enhancement to generate an output image. For example, the raw image may be processed using the decoded fixed bound calibration data to compensate the calibrated artefacts to generate a compensated image or image compensation data. Further, the fixed bound calibration data controller (250) is configured to store the generated output image in the electronic device (200). For example, the output image may include the image compensation data.

In an exemplary embodiment of the present inventive concept, the fixed bound calibration data controller (250) is configured to parse a compressed frequency component using at least one of a coded frequency coefficient and/or a parse bit map. Further, the fixed bound calibration data controller (250) is configured to perform an inverse transform process on the parsed frequency component to produce spatial domain data and decode the encoded fixed bound calibration data using the spatial domain data. The inverse transform process is performed on the parsed frequency component to produce the spatial domain data using an offset.

For example, the fixed bound calibration data controller (250) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (230) is configured to execute instructions stored in the OTP memory (210) and to perform various processes. The communicator (220) is configured for communicating internally with internal hardware components and with external devices via one or more networks. In addition, the OTP memory (210) stores instructions to be executed by the processor (230). Further, at least one of the plurality of modules/controller may be implemented through an AI model using the data driven controller (e.g., AL controller or ML controller).

Although the FIG. 2 shows various hardware components of the electronic device (200), the present inventive concept is not limited thereto. In an exemplary embodiment of the present inventive concept, the electronic device (200) may include less or more components. Further, the labels or names of the components are used for illustrative purpose, and they do not limit the scope of the present inventive concept. One or more components can be combined together to perform the same or similar function in the electronic device (200).

Figure 3:
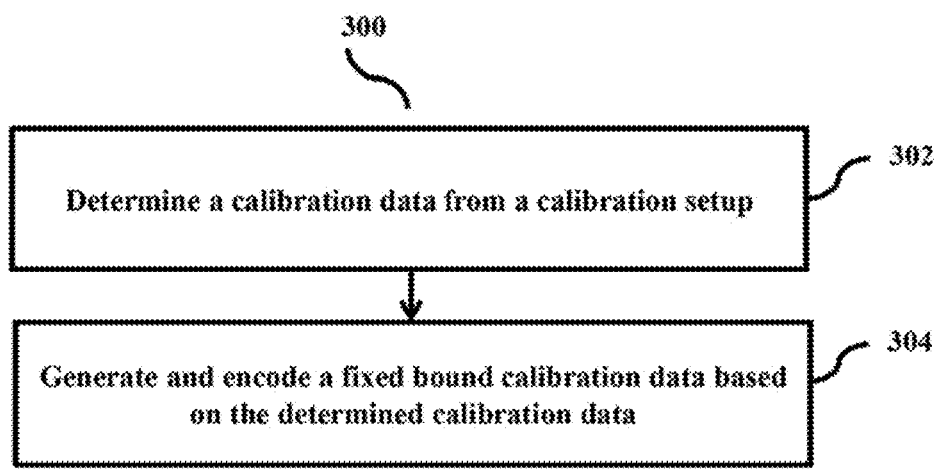
FIGS. 3 and 4 are flow charts illustrating a method for handling a fixed bound calibration data, according to an exemplary embodiment of the present inventive concept.
Figure 4:
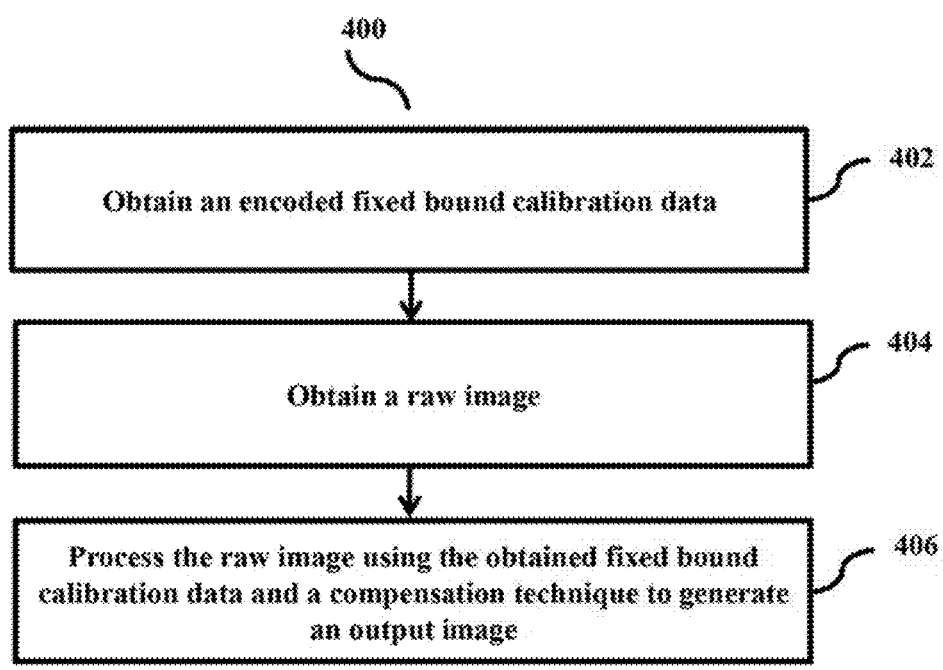

FIG. 3 and FIG. 4 illustrate flow charts (300 and 400) illustrating a method for handling the fixed bound calibration data, according to an exemplary embodiment of the present inventive concept.

As shown in the FIG. 3, the operations (302 and 304) are performed by the fixed bound calibration data controller (250). At step 302, the method includes determining the calibration data from the calibration setup. At step 304, the method includes generating and encoding the fixed bound calibration data based on the determined calibration data.

As shown in the FIG. 4, the operations (402-406) are performed by the fixed bound calibration data controller (250). At step 402, the method includes obtaining the encoded fixed bound calibration data. At step 404, the method includes obtaining the raw image. At step 406, the method includes processing the raw image using the obtained fixed bound calibration data and at least one compensation technique to generate an output image.

The method, according to an exemplary embodiment of the present inventive concept, can be used to compress the calibration data to a fixed size while keeping a quality of output associated with the calibration data, which uses the data, preserved. In the method, according to an exemplary embodiment of the present inventive concept, an increase in a number of megapixels adds more size to the fixed bound calibration data, and an increase in crosstalk occurs with a decrease in pixel size in the memory (210).

Figure 5:
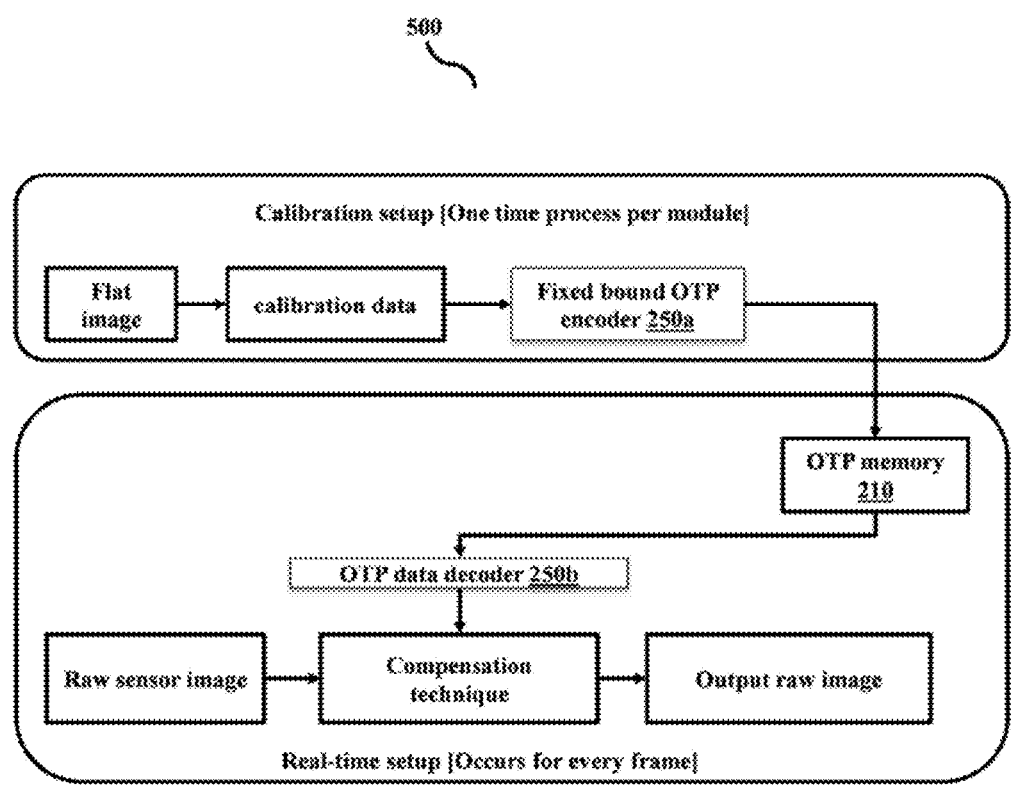
FIG. 5 illustrates an electronic device that handles a fixed bound calibration data, according to an exemplary embodiment of the present inventive concept.

FIG. 5 is an example illustration (500) in which the electronic device (200) handles the fixed bound calibration data, according to an exemplary embodiment of the present inventive concept. The operations and functions of the electronic device (200) are already explained in conjunction with the FIG. 2.

The electronic device (200) determines the calibration data from the calibration setup. In addition, the electronic device (200) generates and encodes the fixed bound calibration data based on the determined calibration data using the fixed bound OTP encoder (250a). Further, the electronic device (200) stores the encoded fixed bound calibration data in the OTP memory (210). The electronic device (200) obtains the encoded fixed bound calibration data and the raw image. For example, the encoded fixed bound calibration data may be decoded by using the OTP data decoder (250b) to obtain decoded fixed bound calibration data. In addition, by using the OTP data decoder (250b), the electronic device (200) processes the raw image using the obtained fixed bound calibration data and uses at least one compensation technique to generate an output image by using the OTP data decoder (250b).

Figure 6:
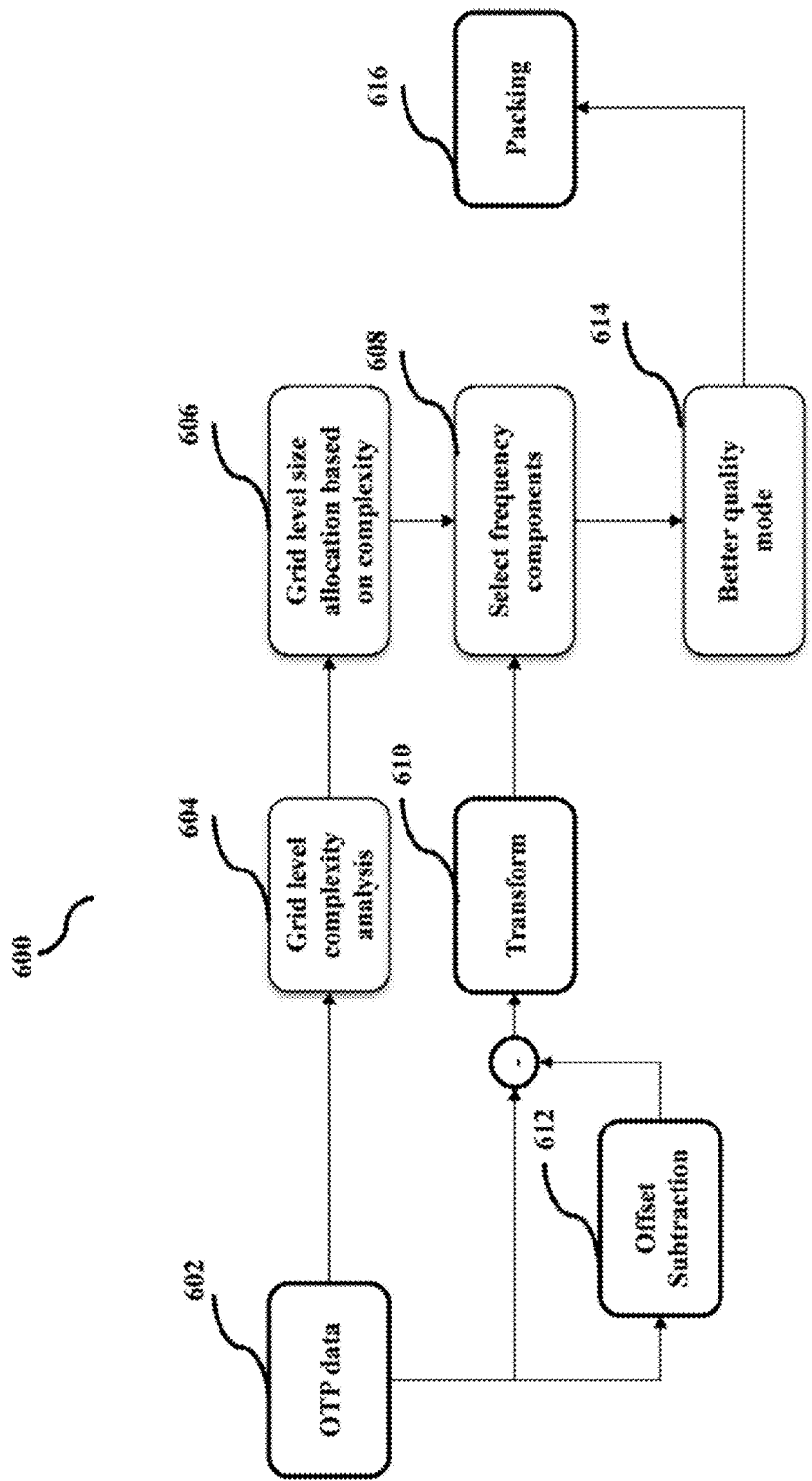
FIG. 6 is a flow chart illustrating a method for handling the fixed bound calibration data, according to an exemplary embodiment of the present inventive concept.

FIG. 6 is a flow chart (600) illustrating a method for handling the fixed bound calibration data, according to an exemplary embodiment of the present inventive concept. At step 602, the OTP data post calibration is received by the electronic device (200) for each of the sensor (240). The data may be OTP data related to pixel cross talk, bad pixel data or any other data specific to the sensor (240). For example, all the calibrated data, which needs to be compressed, may be two or more dimensional in nature and can be grouped into separate sections called grids. The goal of the compression is to efficiently allocate the data among the grids so that a loss in reconstruction quality will not deteriorate the calibration data which can affect the image quality.

At step 604, the OTP data is sent to a grid complexity analysis module (e.g., circuit or processor) where the individual grid complexity is estimated. For example, the complexity estimation can be carried out by any methods that are similar to measuring Entropy/Variance of the grid. At step 606, once the complexity at grid level is estimated, the bit allocation may be determined based on the complexity analysis.

At steps 610 and 612, the offset at the input may be computed and used if the data is highly correlated, spatially. The offset may be a fixed component that is subtracted from all the data elements to reduce the overall magnitude of a signal. The data is transformed to a frequency domain to achieve the energy compaction.

At step 608, the frequency components along with the grid level allocation information are transmitted to a frequency selection module (e.g., circuit) for picking the valid frequency components to represent the data. The hybrid techniques of frequency selection can be used here to address smooth and noisy data.

Figure 7:
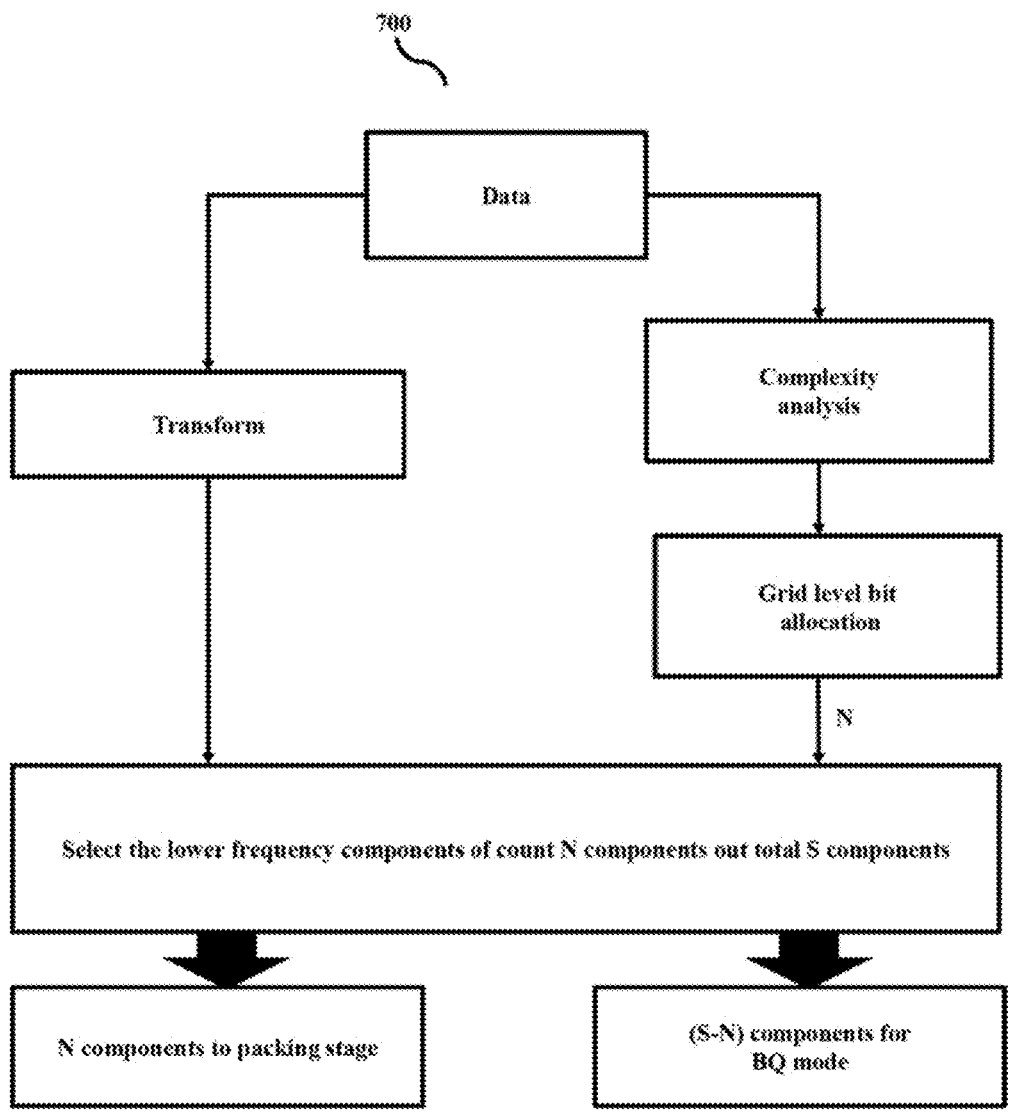
FIGS. 7, 8, and 9 illustrate a frequency component selection, according to an exemplary embodiment of the present inventive concept.

The method uses various selection mechanisms for frequency selection, one of which focuses on picking low frequency data based on the allocated size (as shown in the FIG. 7). A second selection mechanism focuses on the random coefficient positions based on a magnitude of the frequency (as shown in the FIG. 9). The low frequency data is known to work well with minimal spatial variance of data, but it may fail with noisy or high variance data. The techniques of selection of frequency components may help in the case of noisy data by picking the most significant (e.g., largest) frequency components along with their positions in terms of a two dimensional grid map. The greater the number of frequency components, the better is the data representations may be, but it is limited by allocated budget.

At step 614, the method uses a scheme referred to as better quality mode (BQ), in which the fixed bound OTP encoder (250*a*) has a low complex two pass mode. In the BQ mode, the data, which is already picked, goes through a lossless compression and it may result in extra budget to pick more frequency components. The unselected frequency components that were not originally picked may get picked as a result. The size of the compressed data may remain the same which is a purpose of the electronic device (200), but it helps in increasing the quality of the data.

At step 616, after all the careful analysis of data and selection of components, the data is sent to a packing stage, which adds specific header information and sends the data out.

Figure 8:
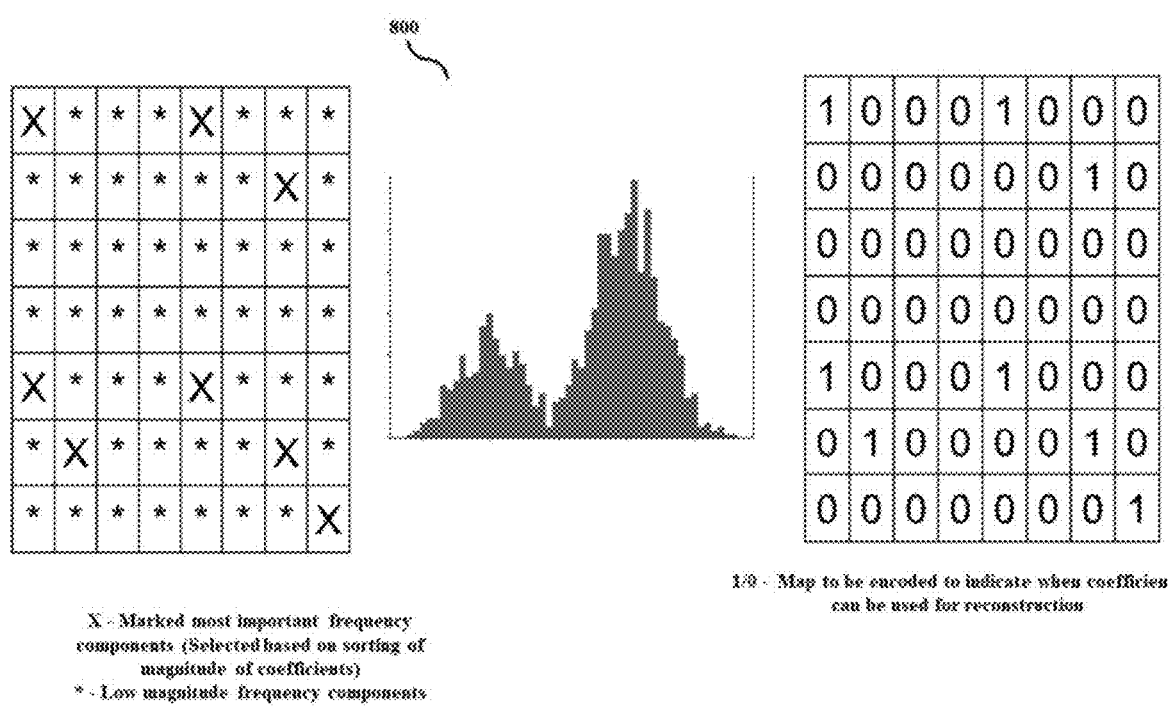
Figure 9:
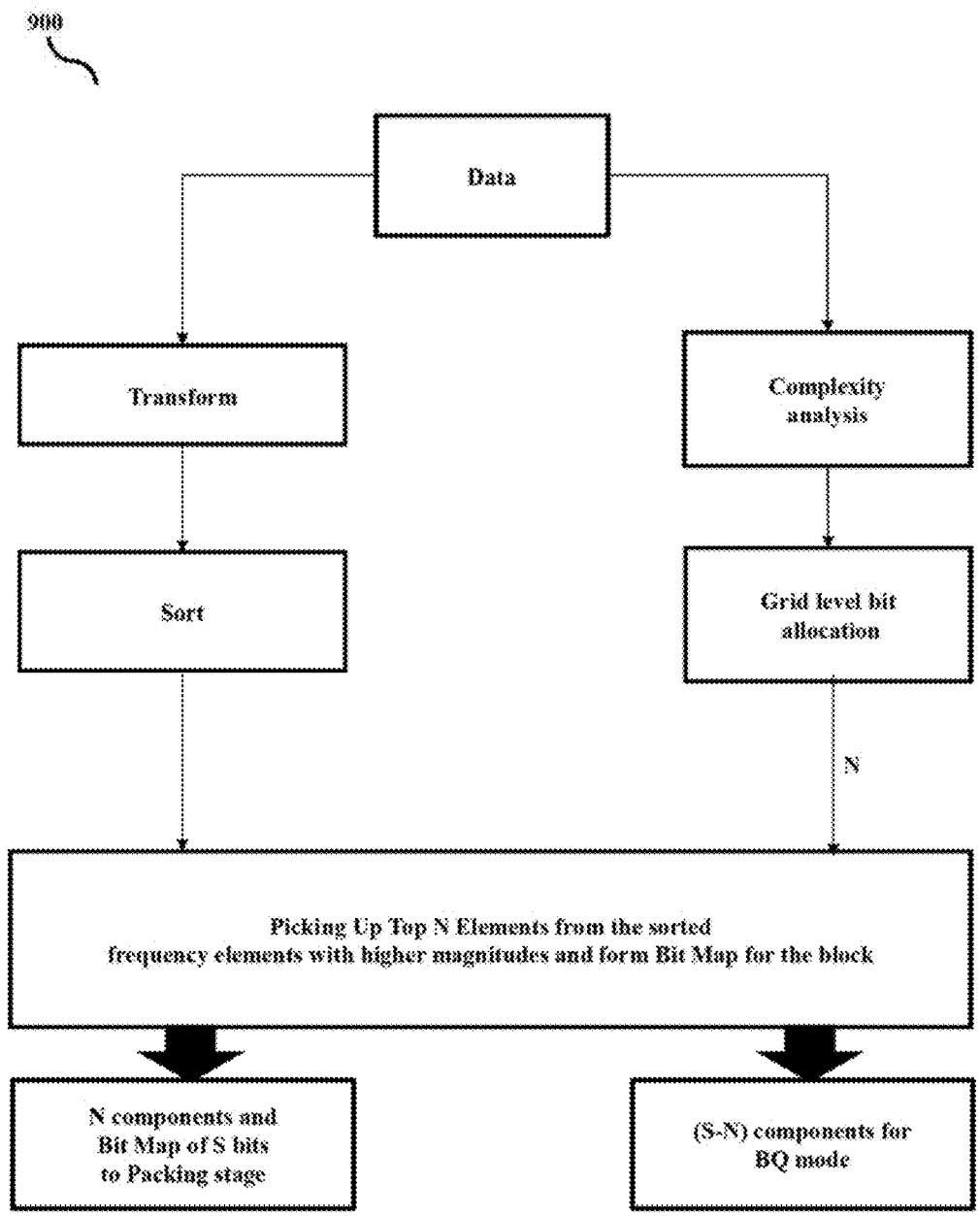

FIG. 7 to FIG. 9 are illustrations (700-900) in which frequency component selection are depicted, according to an exemplary embodiment of the present inventive concept. The FIGS. 7 to 9 are explained in conjunction with the FIG. 6.

Referring to FIG. 7, for the low variance and high correlation case, the number of frequency components encoded depends on the number of bytes allocated as a result of frame complexity measurement. Table 3 represents the frequency component selection.

TABLE 3

| 0  | 1  | 2  | 3  | 4  | 5  | 6  | 7  | 8  | 9  |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |

Referring to FIG. 7, the calibration data goes through a transform module (e.g., circuit) to get converted to the frequency domain. The complexity analysis and bit allocation module (e.g., circuit) allocates the bits, and based on the allocation of bits, the lower the N number of frequency components may be selected for next stage of packing. The rest of (S-N) components may be used for the BQ mode.

For example, from the table 3, For S=80, N=8, Selected components=0, 1, 2, 10, 11, 12, 20, and 21. For S=80, N=16, Selected components=0, 1, 2, 3, 10, 11, 12, 13, 20, 21, 22, 23, 30, 31, 32, and 33.

Referring to the FIG. 8, for the high variance and less correlation case, the number of frequency components encoded depends on the number of bytes allocated as a result of frame complexity measurement. The technique is not to remove high frequency components. The coefficients are sorted, and maximum magnitude coefficients are picked up. The selected components along with a bit map are sent to the electronic device (200).

Referring to the FIG. 9, the electronic device (200) picks up top N elements from the sorted frequency elements with higher magnitudes and forms the bit map for the block.

[[16, 11, 10, 16, 24, 40, 51, 61],
[12, 12, 14, 19, 26, 58, 60, 55],
[14, 13, 16, 24, 40, 57, 69, 56],
[14, 17, 22, 29, 51, 87, 80, 62],
[18, 22, 37, 56, 68, 109, 103, 77],
[24, 35, 55, 64, 81, 104, 113, 92],
[49, 64, 78, 87, 103, 121, 120, 101],
[72, 92, 95, 98, 112, 100, 103, 99]]

-continued $$\text{Transform} \longrightarrow \begin{matrix} [[461 & -168 & -14 & 30 & -31 & 8 & 1 & -2] \\ [-194 & -1 & 38 & 4 & 6 & 2 & 5 & -5] \\ [32 & 43 & 10 & -22 & 15 & -10 & -5 & 4] \\ [-2 & -27 & -1 & 0 & -2 & 7 & 4 & -3] \\ [2 & 11 & 0 & 1 & 4 & -4 & 1 & -2] \\ [0 & -3 & 2 & 2 & 0 & -2 & 0 & 2] \\ [-9 & 6 & 4 & -8 & 7 & -1 & -6 & 7] \\ [8 & -1 & -3 & 1 & 2 & 3 & -1 & -1]] \end{matrix}$$

For example, for the first frequency component selection technique, if the N=9 then, the output will be 461, −168, −14, −194, −1, 38, 32, 43, and 10. For the second frequency component selection technique, if the N=9, then the output will be =461, −168, 30, 31, −194, 38, 32, 43, and −27. Below is the bit map information:

[[1 1 0 1 1 0 0 0]

[1 0 1 0 0 0 0 0]

[1 1 0 0 0 0 0 0]

[0 1 0 0 0 0 0 0]

[0 0 0 0 0 0 0 0]

[0 0 0 0 0 0 0 0]

[0 0 0 0 0 0 0 0]

[0 0 0 0 0 0 0 0]]

Figure 10:
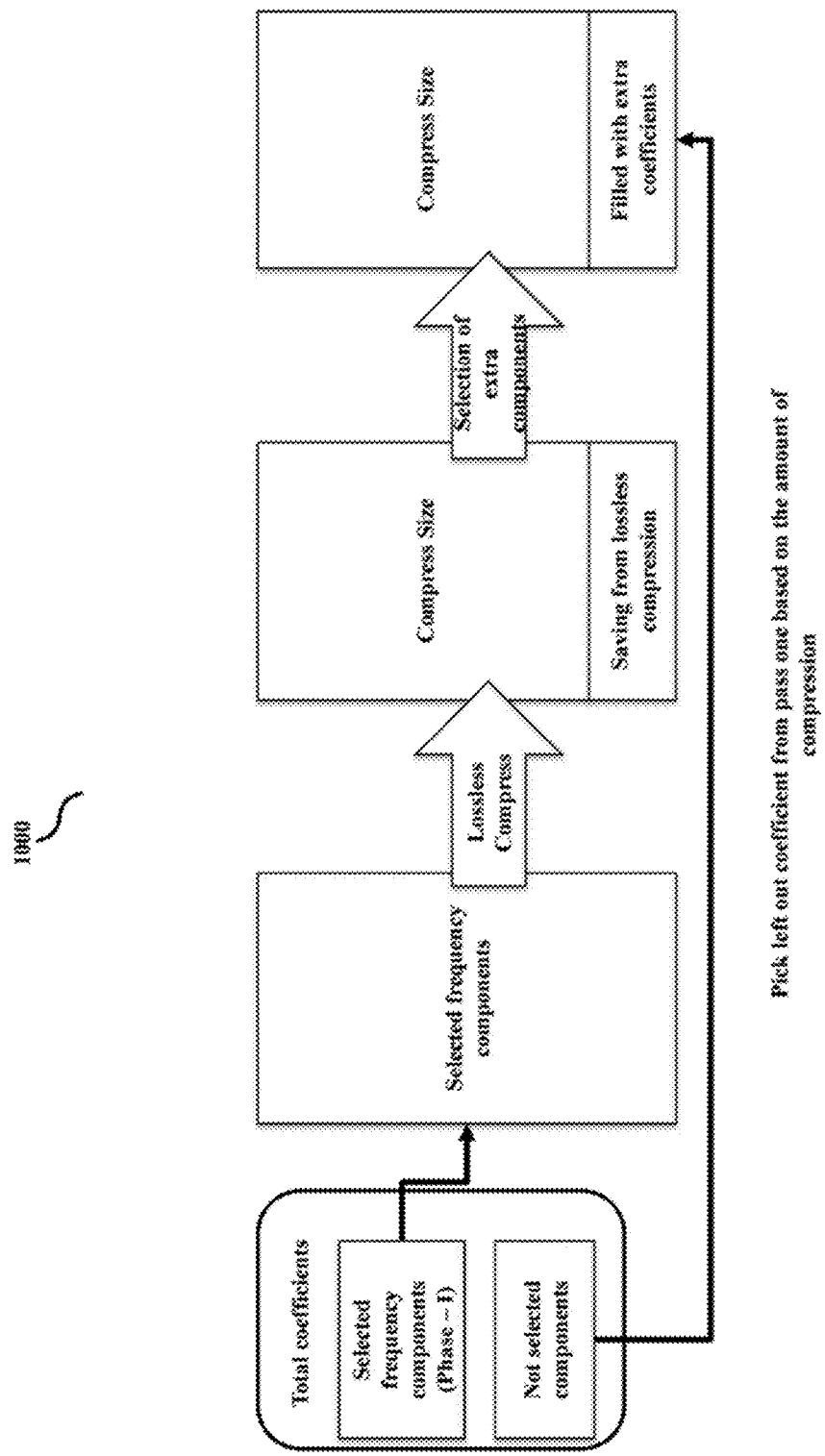
FIG. 10 illustrates lossless compression of selected frequency components, according to an exemplary embodiment of the present inventive concept.

FIG. 10 is an illustration (1000) in which lossless compression of selected frequency components is depicted, according to an exemplary embodiment of the present inventive concept. Referring to the FIG. 10, the lossless compression is applied on the selected components using a binary arithmetic coding. In addition, any other scheme can be used for the lossless compression. The extra frequency components selected based on the gain from the lossless compression and the simple packing scheme used for the extra selected component to avoid complex multi pass coding may increase the quality of the data.

FIG. 11 is an illustration (1100) in which operations of the OTP data decoder (250*b*) is illustrated, according to an exemplary embodiment of the present inventive concept. Referring to the FIG. 11, the compressed fixed bound calibration data is taken as the input to the electronic device (200). The decompressed calibration data is used for an image enhancement technique during image capture. At step 1102, the encoded data which is packed with a certain format first goes through a parsing stage which produces all the parameters used in the OTP data decoder (250*b*). At steps 1104 and 1106, the parse frequency components parses the compressed frequency components based on the selected technique used in the fixed bound OTP encoder (250*a*) and the best quality (BQ) mode. At step 1108, if another technique is used for the frequency component selection, the bit map is also parsed. At step 1110, once the frequency components (e.g., a compressed frequency component) are parsed and arranged in a correct order, then it goes through an inverse transform process to produce spatial domain data. At step 1112, if the offset is used, then the offset can be added to the inverse transformed data to form the reconstructed data.

The various actions, acts, blocks, steps, or the like in the flow charts (e.g., 300, 400 and 600) may be performed in the order presented, in a different order, or simultaneously. Further, in an exemplary embodiment of the present inventive concept, some of the actions, acts, blocks, steps, or the like may be omitted, added, modified, skipped, or the like, as would be apparent to a person of ordinary skill in the art, without departing from the spirit and scope of the present inventive concept.

The exemplary embodiments of the present inventive concept disclosed herein can be implemented through at least one software program running on at least one hardware device and performing network management functions to control the elements.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the present inventive concept has been particularly shown and described with reference to example embodiments thereof, it will be apparent to those of ordinary skill in the art that various changes in form and detail may be made thereto without departing from the spirit and scope of the present inventive concept.

What is claimed is:

1. A method for handling a fixed bound calibration data in an electronic device, the method comprising:
   determining, by the electronic device, a calibration data from a calibration setup; and
   generating and encoding, by the electronic device, a fixed bound calibration data based on the determined calibration data,
   wherein the generating, by the electronic device, the fixed bound calibration data based on the determined calibration data comprises generating, by the electronic device, the fixed bound calibration data based on a selected frequency component and a grid level bit budget.

2. The method of claim 1, further comprising:
   storing, by the electronic device, the encoded fixed bound calibration data in a one time programmable (OTP) memory of the electronic device.

3. The method of claim 2, further comprising:
   decoding, by the electronic device, the encoded fixed bound calibration data that is stored in the OTP memory;
   obtaining, by the electronic device, a raw image;
   processing, by the electronic device, of the raw image using the decoded fixed bound calibration data to compensate calibrated artefacts to generate image compensation data; and
   storing, by the electronic device, an output image comprising in the electronic device, wherein the output image is generated by the electronic device and includes the image compensation data.

4. The method of claim 1, wherein the generating, by the electronic device, the fixed bound calibration data based on the determined calibration data further comprises:
   estimating, by the electronic device, a grid level complexity for the calibration data;
   allocating, by the electronic device, the grid level bit budget based on the estimated grid level complexity;
   transforming, by the electronic device, a grid level data to a frequency domain;
   selecting, by the electronic device, a frequency component associated with the calibration data; and
   applying, by the electronic device, a lossless compression on the selected frequency component.

5. The method of claim 4, wherein the grid level complexity is estimated by using at least one of measuring an entropy of a grid corresponding to the grid level complexity or measuring a variance of the grid.

6. The method of claim 4, wherein the grid level bit budget is allocated based on the measured grid level complexity.

7. The method of claim 4, wherein the grid level data is transformed into the frequency domain using a signal processing method.

8. The method of claim 4, wherein the frequency component is selected by determining a low frequency data based on the allocated grid level bit budget.

9. The method of claim 4, wherein the frequency component is selected by determining a coefficient position based on a magnitude of the transformed calibration data.

10. The method of claim 4, wherein the selecting, by the electronic device, the frequency component associated with the calibration data comprises:
    determining, by the electronic device, an offset of the calibration data, wherein the offset is subtracted from all data elements to control a magnitude of a signal;
    transforming, by the electronic device, the calibration data to a frequency domain to generate an energy compaction using the data with offset subtracted from the calibration data; and
    selecting, by the electronic device, the frequency component associated with the calibration data based on the generated energy compaction.

11. The method of claim 3, wherein the decoding, by the electronic device, the encoded fixed bound calibrated data comprises:
    parsing, by the electronic device, a compressed frequency component using at least one of a coded frequency coefficient and a parse bit map;
    performing, by the electronic device, an inverse transform process on the parsed frequency component to produce a spatial domain data;
    decoding, by the electronic device, the encoded fixed bound calibration data using the spatial domain data.

12. The method of claim 11, wherein the inverse transform process is performed on the parsed frequency component to produce the spatial domain data using an offset.

13. The method of claim 1, wherein the fixed bound calibration data corresponds to a data corresponding to a sensor of the electronic device, wherein the calibration data comprises pixel cross talk data, bad pixel data and lens shading data.

14. A method for handling a fixed bound calibration data in an electronic device, the method comprising:
   obtaining, by the electronic device, an encoded fixed bound calibration data;
   obtaining, by the electronic device, a raw image;
   processing, by the electronic device, the raw image using the obtained encoded fixed bound calibration data and at least one compensation technique to generate an output image; and
   estimating, by the electronic device, a grid level complexity for the calibration data.

15. The method of claim 14, further comprising:
   storing the generated output image in the electronic device.

16. The method of claim 14, wherein the encoded fixed bound calibration data is obtained by:
   determining a calibration data from a calibration setup; and
   generating and encoding the fixed bound calibration data based on the determined calibration data.

17. An electronic device configured to handle a fixed bound calibration data, the electronic device comprising:
   a processor,
   a one time programmable (OTP) memory comprising information, and
   a fixed bound calibration data controller coupled with the processor and the OTP memory and configured to:
      determine a calibration data from a calibration setup; and
      generate and encode a fixed bound calibration data based on the determined calibration data, wherein the fixed bound calibration data is generated based on a selected frequency component and a grid level budget.

18. The electronic device of claim 17, wherein the fixed bound calibration data controller is configured to store the encoded fixed bound calibration data in the OTP memory.

19. The electronic device of claim 17, wherein the fixed bound calibration data controller is configured to:
   decode the encoded fixed bound calibration data in the OTP memory;
   obtain a raw image;
   process the raw image using the decoded fixed bound calibration data to compensate calibrated artefacts to generate an output image; and
   store the generated output image in the electronic device.

20. The electronic device of claim 17, wherein the fixed bound calibration data corresponds to a data corresponding to a sensor of the electronic device, wherein the data comprises pixel cross talk data, bad pixel data and lens shading data.

* * * * *